United States Patent [19]
Takagi et al.

[11] Patent Number: 5,838,300
[45] Date of Patent: Nov. 17, 1998

[54] WINDOW SHARING SYSTEM

[75] Inventors: Tsuneyoshi Takagi, Kawasaki; Yuichi Bannai, Koganei; Takeshi Kawazome, Utsunomiya, all of Japan

[73] Assignee: Canon Kabushiki Kaisha, Tokyo, Japan

[21] Appl. No.: 663,361

[22] Filed: Jun. 13, 1996

[30] Foreign Application Priority Data

Jun. 19, 1995 [JP] Japan .................................. 7-175460

[51] Int. Cl.⁶ ...................................................... G09G 5/08
[52] U.S. Cl. ......................................... 345/145; 345/157
[58] Field of Search .............................. 345/2, 1, 3, 115, 345/118, 121, 329, 330, 331, 332, 340, 145, 146, 157, 162

[56] References Cited

U.S. PATENT DOCUMENTS

| | | | |
|---|---|---|---|
| 5,353,398 | 10/1994 | Kitahara et al. | 345/332 |
| 5,392,400 | 2/1995 | Berkowitz et al. | 345/332 |
| 5,491,743 | 2/1996 | Shiio et al. | 345/332 |
| 5,548,304 | 8/1996 | Yoshino et al. | 345/340 |
| 5,654,726 | 8/1997 | Mima et al. | 345/2 |

*Primary Examiner*—Xiao Wu
*Attorney, Agent, or Firm*—Fitzpatrick, Cella, Harper & Scinto

[57] ABSTRACT

A window sharing system of a server client method in which a client application communicates with a plurality of servers by distributing a message and an operation is executed by switching an operation right for the client application. The system includes a window ID obtainer for obtaining a window ID of a common window formed by the client application and storing the window ID into a first memory; an operation right information obtainer for obtaining information of the operation right for the client application and storing the information into a second memory; an operation pointer display controller for displaying an operation pointer to operate the client application to the common window on the basis of the window ID stored in the first memory; an operation right information display controller for adding the operation right information stored in the second memory to the operation pointer and displaying the information; and an operation right information switching unit for storing information regarding the user who performed a click operation by a mouse-cursor on the operation pointer into the second memory and switching the operation right.

26 Claims, 8 Drawing Sheets

| SERVER NO. | USER NAME | WORK STATUS |
|---|---|---|
| 0 | USERA | ENTER |
| 1 | USERB | LEAVE |
| 2 | USERC | ACTIVE |
| ⋮ | ⋮ | ⋮ |

FIG.8
PRIOR ART

WINDOW SHARING SYSTEM

BACKGROUND OF THE INVENTION

1. Field of the Invention

The present invention relates to a window sharing system of a server client method and, more particularly, to a window sharing system which can improve work efficiency of the user and which is suitable when an efficient cooperative work is executed.

2. Related Background Art

Hitherto, a window sharing system for displaying information in accordance with necessity of a plurality of users has been developed. In the case of obtaining information regarding the user having an operation right of the window sharing system, a user list displayed in a window separately opened is referred to or an inputting operation is executed to a window which is actually being used for a work and whether the inputting operation is accepted or not is confirmed. In the case of performing a transferring operation of the operation right, a button realized in a window which is separately opened is clicked or a menu of a mouse is selected.

On the other hand, software for supporting a group work such that a plurality of users cooperatively execute one work by using a plurality of computers connected by a network has been developed. As a system of such a kind, a TV conference system on desks by computers is a representative example. In such a system, a drawing paint tool which corresponds to a white board in a conference room and can be seen by all of the users and into which data can be written or the like is used.

A server client method in which a client (party who gets services) and a server (party who gives services) which are connected to a network execute processes synchronously with each other has been spread. In the case of a computer using the window system of the server client method, the tool as mentioned above is not newly constructed as an exclusive-use tool for supporting a group work, but it can be constructed by commonly using a window displayed by an ordinary application tool for personal use by a plurality of users.

Figure 8:
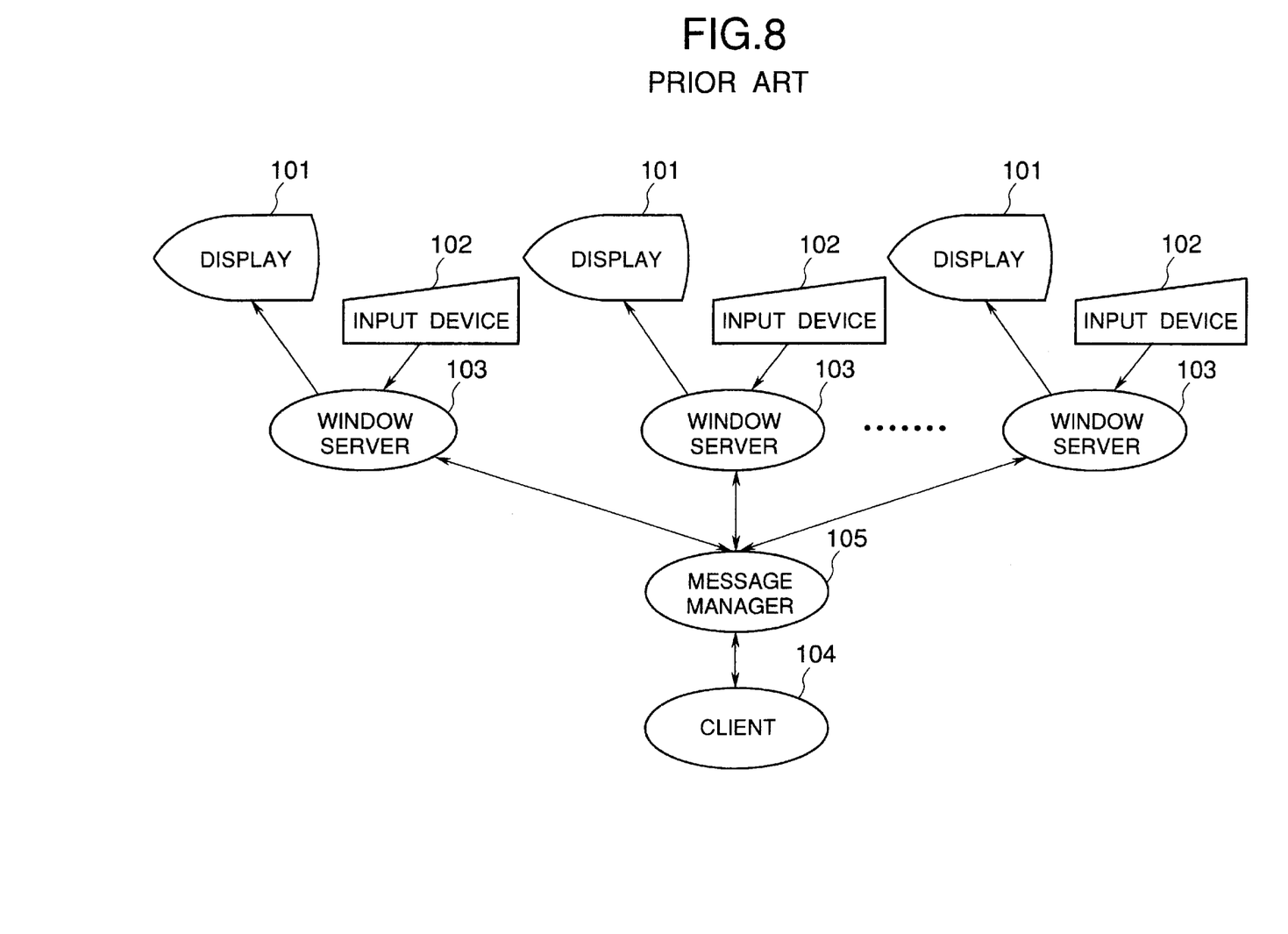
FIG. 8 is a block diagram showing a schematic construction of a conventional system.

FIG. 8 is a block diagram for explaining a construction of a window system of the conventional server client system. Each computer (terminal) has a display 101 such as a CRT, an LCD (liquid crystal display), etc., and an input device 102 such as a keyboard, mouse, pen inputting device, and the like. They are managed by a window server 103. The user can interactively perform the inputting operation through the input device 102 while watching the display 101 through the window server 103. When the user ordinarily uses by himself an ordinary application tool for a personal use, a client 104 of the application tool operates by communicating a message (X protocol in an X window system) between the computer (terminal) which is used and the window server 103. In the case of sharing the application tool by a plurality of users, however, a message manager 105 relays a message between each window server 103 and the client 104.

The message manager 105 when it is seen from each of the window servers 103 is a client and each window server 103 transmits a message to be transmitted to the client 104 to the window sharing server and the message manager 105 transmits the messages received from the window servers 103 to the client 104. Each window server 103 receives the message transmitted from the message manager 105 as a message sent from the client 104. On the other hand, the message manager 105 when it is seen from the client 104 is a window server. A message to be transmitted to the window server 103 is sent to the message manager 105. The message manager 105 transmits the message received from the client 104 to all of the window servers 103. The client 104 receives the message transmitted from the message manager 105 as a message sent from the window server 103.

As mentioned above, in the case of the computer using the window system of the server client method, by inserting the window sharing server between the plurality of window servers 103 and the client 104, a system in which an ordinary application tool for a personal use is shared by a plurality of users can be constructed. In addition, by allowing a pointer of each user on the window of the commonly used application tool to be seen by all of the users, works of the cooperative workers are visualized, thereby enabling the joint work to be easily executed.

In the above-mentioned conventional window sharing system, however, a window of a user list has to be opened or a popup (accessing of data) has to be executed in order to obtain information regarding the user having the operation right or to transfer the operation right. Those operations are extra operations for the users working in the window sharing system, so that there is an inconvenience such that work efficiency deteriorates. When the work is executed by overlappingly opening a plurality of windows on the display, there is also an inconvenience such that it is difficult to find out the corresponding user list.

In the window system of the server client method shown in FIG. 8, a system in which the window displayed by the ordinary application tool for a personal use is shared by a plurality of users can be constructed. By displaying a pointer of each of the users on the common window so that everyone can see it, the work of the group workers can be visualized to a certain extent. There is a possibility that although the pointer can be seen on the window, it is difficult to know whether the pointer merely exists on the window and no work is executed or the operator tries to input something. Therefore, there is a problem such that the visualization of the joint work is still insufficient.

SUMMARY OF THE INVENTION

The invention is proposed to solve the above problems and it is an object of the invention to provide a window sharing system which can obtain information regarding the user having an operation right without executing an extra operation and can transfer the operation right, thereby enabling work efficiency to be improved.

It is another object to provide a window sharing system in which whether an inputting operation has been performed for a common window or not is enabled to be confirmed on the common window on a display apparatus of another terminal, so that the user can confirm it without looking away from the common window and a cooperative work can be more efficiently performed.

According to the invention, there is provided a window sharing system of a server client method constructed in a manner such that a client application communicates with a plurality of servers by distributing a message and an operation is executed by switching an operation right for the client application, the system comprising: window ID obtaining means for obtaining a window ID of a common window formed by the client application and storing the window ID into first memory means; operation right information obtaining means for obtaining information of the operation right for the client application and storing the information into second memory means; operation pointer display control means for displaying an operation pointer to operate the client application to the common window on the basis of the window ID stored in the first memory means; operation right information display control means for adding the operation right information stored in the second memory means to the operation pointer and displaying the information; and operation right information switching means for storing information regarding the user who executed a click operation by a mouse-cursor on the operation pointer into the second memory means and switching the operation right.

According to the invention, there is also provided a window sharing system of a server client method in which a window displayed by an application is commonly used by a plurality of terminals under a network, the system comprising: message managing means, connected between a window server of each terminal and a client, for relaying and distributing a message which is transmitted and received between each window server and the client; status information obtaining means for storing input status information for a common window at each terminal into memory means on the basis of the message which is relayed by the message managing means; and status display control means for displaying the input status information stored in the memory means on a display of each of the terminals.

DETAILED DESCRIPTION OF THE PREFERRED EMBODIMENTS

Embodiments of the invention will be described hereinbelow with reference to the drawings.

(1) First Embodiment

Figure 1:
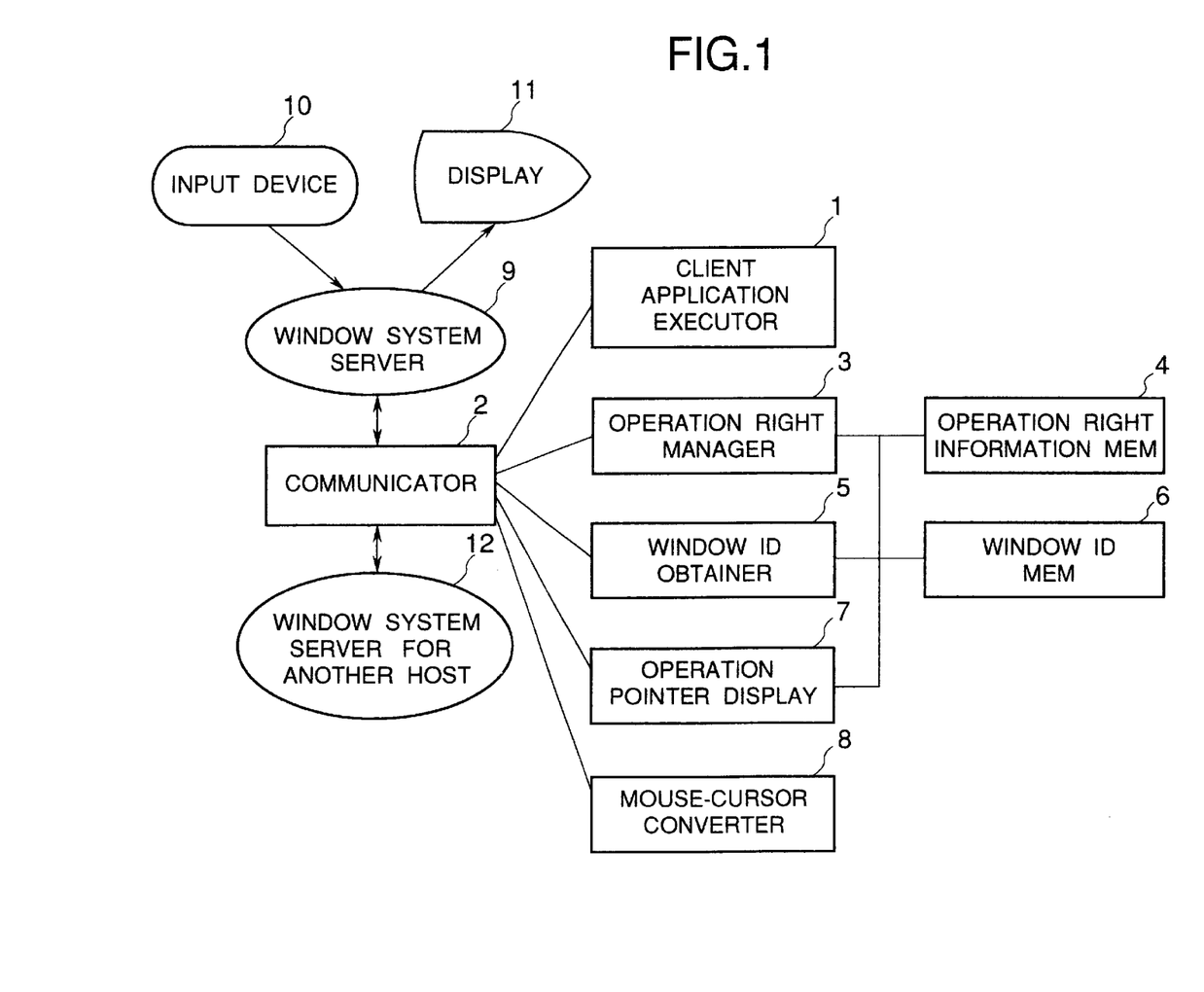
FIG. 1 is a block diagram showing a schematic construction of a window sharing system of the first embodiment of the invention.

FIG. 1 is a block diagram showing a schematic construction of a window sharing system according to the first embodiment. The system comprises: a client application executor 1; a communicator 2; an operation right manager 3; an operation right information memory 4; a window ID obtainer 5; a window ID memory 6; an operation pointer display 7; a mouse-cursor converter 8; a window system server 9; an input device 10; a display 11; and a window system server 12 for another host.

The client application executor 1 is connected to the communicator 2. The operation right manager 3, window ID obtainer 5, operation pointer display 7, and mouse-cursor converter 8 are similarly connected to the communicator 2. The operation right manager 3 and operation pointer display 7 are connected to the operation right information memory 4. The window ID obtainer 5 is connected to the window ID memory 6. The window system server 9 and window system server 12 for another host are connected to communicator 2. The input device 10 and display 11 are connected to the window system server 9.

A construction of each section in the window sharing system will be described in detail. The client application executor 1 executes a main program of a client application. The communicator 2 communicates with servers of a plurality of window systems. The operation right manager 3 manages an operation right for the client application. The operation right information memory 4 stores information which is managed by the operation right manager 3. The window ID obtainer 5 obtains a window ID in the server of each window system of a common window. The window ID memory 6 stores the window ID which is obtained by the window ID obtainer 5. The operation pointer display 7 displays a pointer for operating the client application on the common window.

The mouse-cursor converter 8 converts a bit map (constructed by the number of dots corresponding to a resolution of the display) of the mouse-cursor into a bit map of the operation pointer so that the operation pointer functions as a mouse-cursor or, contrarily, converts the bit map of the operation pointer into the bit map of the mouse-cursor. The window system server 9 denotes a server process of the window system. The input device 10 denotes a keyboard, a mouse, or the like which is used in the window system server 9. The display 11 displays windows and various information. The window system server 12 for another host denotes a server process of the window system in another host and is connected to a window system server 12 for another host via a communication line. An input device and a display (not shown) similar to those of the window system server 9 are also connected to the window system server 12 for another host.

Figure 2:
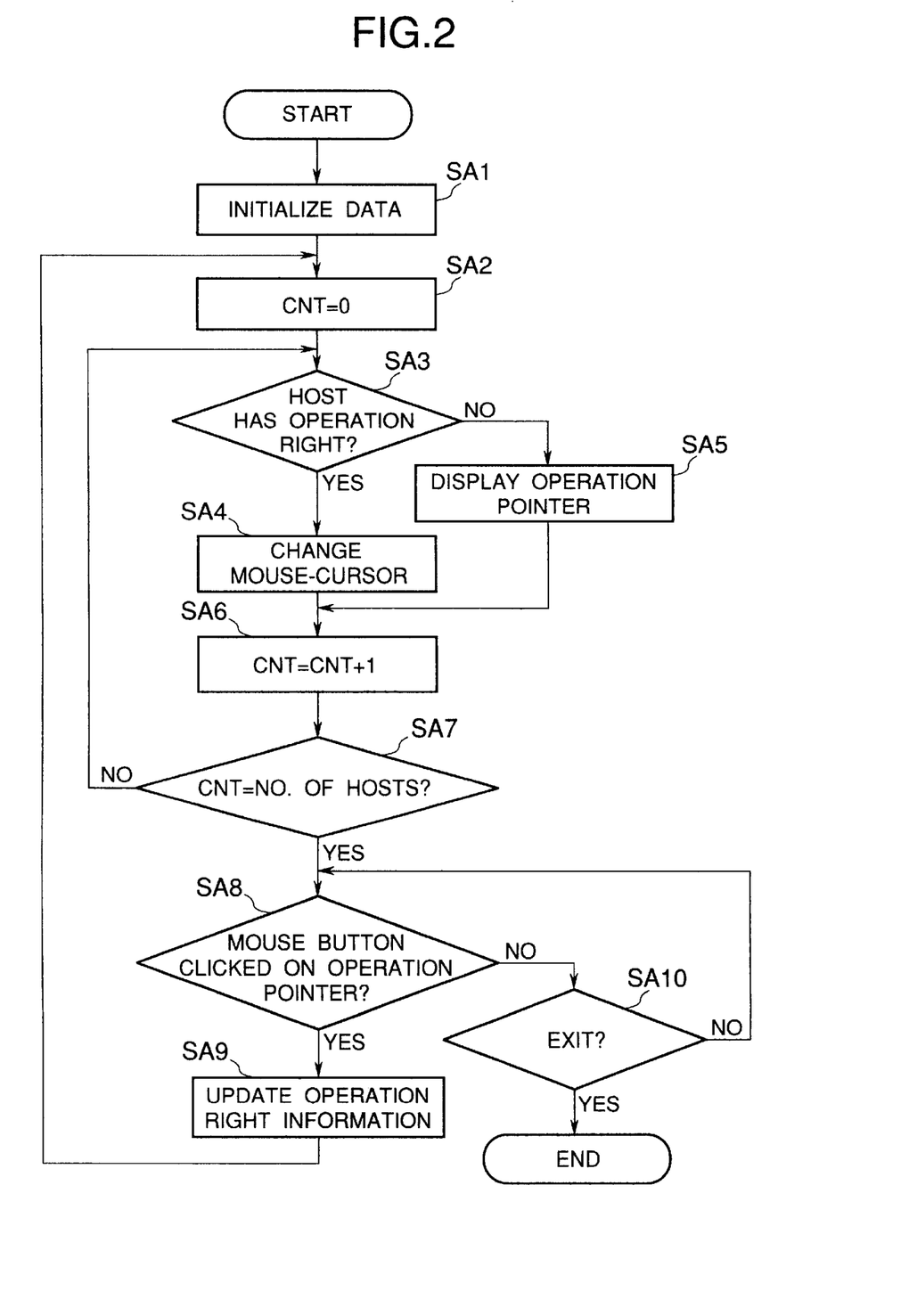
FIG. 2 is a flowchart showing a processing procedure with respect to a display of operation right information and a transfer of an operation right which are executed by the window sharing system of the first embodiment.

FIG. 2 is a flowchart for showing an operation procedure of the window sharing system. The procedure of the system operation will be described with reference to FIGS. 1 and 2.

In FIG. 2, when the window sharing system is activated, various data is initialized (step SA1). Specifically speaking, the operation right information memory 4 and window ID memory 6 are initialized and the window ID in each host is stored into the window ID memory 6. A value of a host number counter (CNT) as a temporary variable is set to 0 (step SA2). A check is made to see whether the host corresponding to the value of the host number counter has the operation right or not (step SA3). The above process is executed by the operation right manager 3 with reference to the value stored in the operation right information memory 4. Information of a certain predetermined host is inputted as an initial value which is stored into the operation right information memory 4. For example, information of the host connected to the system first is inputted.

Figure 3:
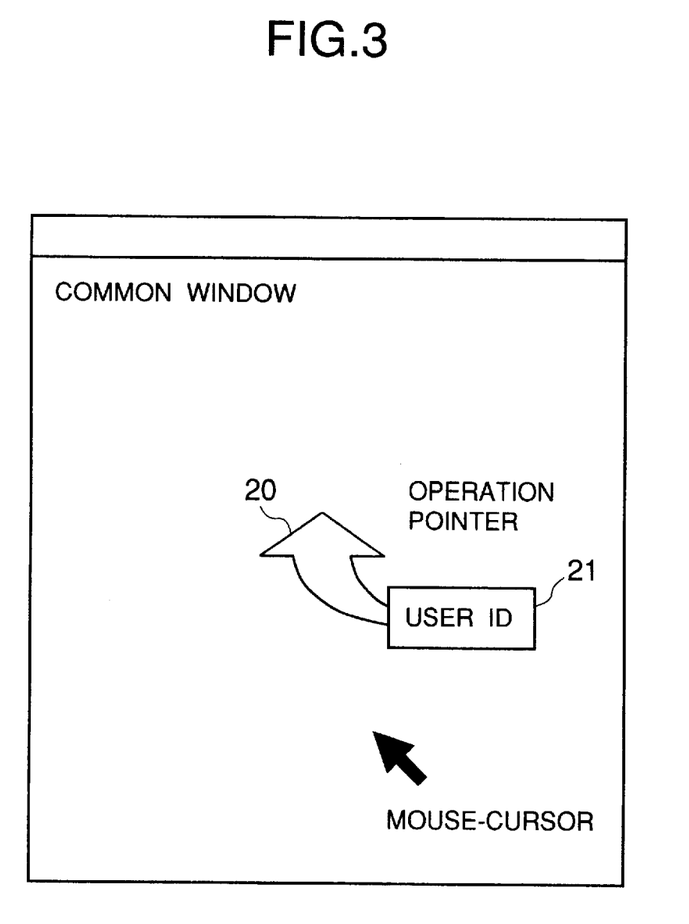
FIG. 3 is an explanatory diagram showing an example of a common window and an operation pointer displayed on a display by the window sharing system of the first embodiment.

When the host has the operation right in step SA3, the mouse-cursor is changed (step SA4). The process is executed in a manner such that the mouse-cursor converter 8 refers to the value stored in the operation right information memory 4, forms a bit map of the operation pointer and converts the bit map of the mouse-cursor in the window into the bit map of the operation pointer in accordance with the contents in the window ID memory 6. The bit map of the operation pointer comprises an arrow 20 for instruction and a user ID 21 of the user who has the operation right as shown in FIG. 3. In this case, a bit map of a portrait photograph of the user also can be used in place of the user ID 21. An arbitrary shape also can be used in place of the arrow 20 as long as the user can instruct.

When the host doesn't have the operation right in step SA3, the operation pointer is displayed (step SA5). The process is executed in a manner such that the operation pointer display 7 refers to the value stored in the operation right information memory 4, forms a bit map of the operation pointer, and displays it onto the common window in the host as a present target in accordance with the contents in the window ID memory 6 so as to be displayed at the same position as the position of the mouse-cursor in the host having the operation right. The position of the mouse-cursor is a relative position which is identical to the position of the bit map of the operation pointer only in the common window. When the mouse-cursor in the common window has already become the bit map of the operation pointer in the host as a present target, the bit map of the mouse-cursor in the common window is changed to the bit map of the mouse-cursor of the original common window.

When the process in step SA4 or SA5 is finished, the value of the host number counter is increased by one (step SA6). The value of the host number counter and the number of all hosts connected are compared (step SA7). When it is judged from the result of the comparison that the value of the host number counter doesn't reach the number of connected hosts, the processes from step SA3 are repeated. On the other hand, when the value of the host number counter reaches the number of connected hosts, the processing routine advances to processes in step SA8 and subsequent steps.

In step SA8, the apparatus waits for an event for the operation pointer in each host and a check is made to see whether the mouse button has been clicked on the operation pointer or not. When the mouse button is depressed in step SA8, information regarding the host in which the button was pressed is obtained and the operation right information is updated (step SA9). The process is executed by rewriting the contents in the operation right information memory 4 by the operation right manager 3. When the process in step SA9 is finished, the processes from step SA2 are repeated.

When the mouse button is not depressed in step SA8, a check is made to see whether an instruction to finish the system has been made or not (step SA10). When there is an end instruction in step SA10, the system is finished. If NO arises in step SA10, the processes from step SA8 are repeated.

The invention also can be applied to a system constructed by a plurality of apparatuses as in the first embodiment or also can be applied to an apparatus constructed by one equipment. The invention also can be applied to a case wherein the invention is achieved by supplying a program to a system or an apparatus.

(2) Second Embodiment

Figure 4:
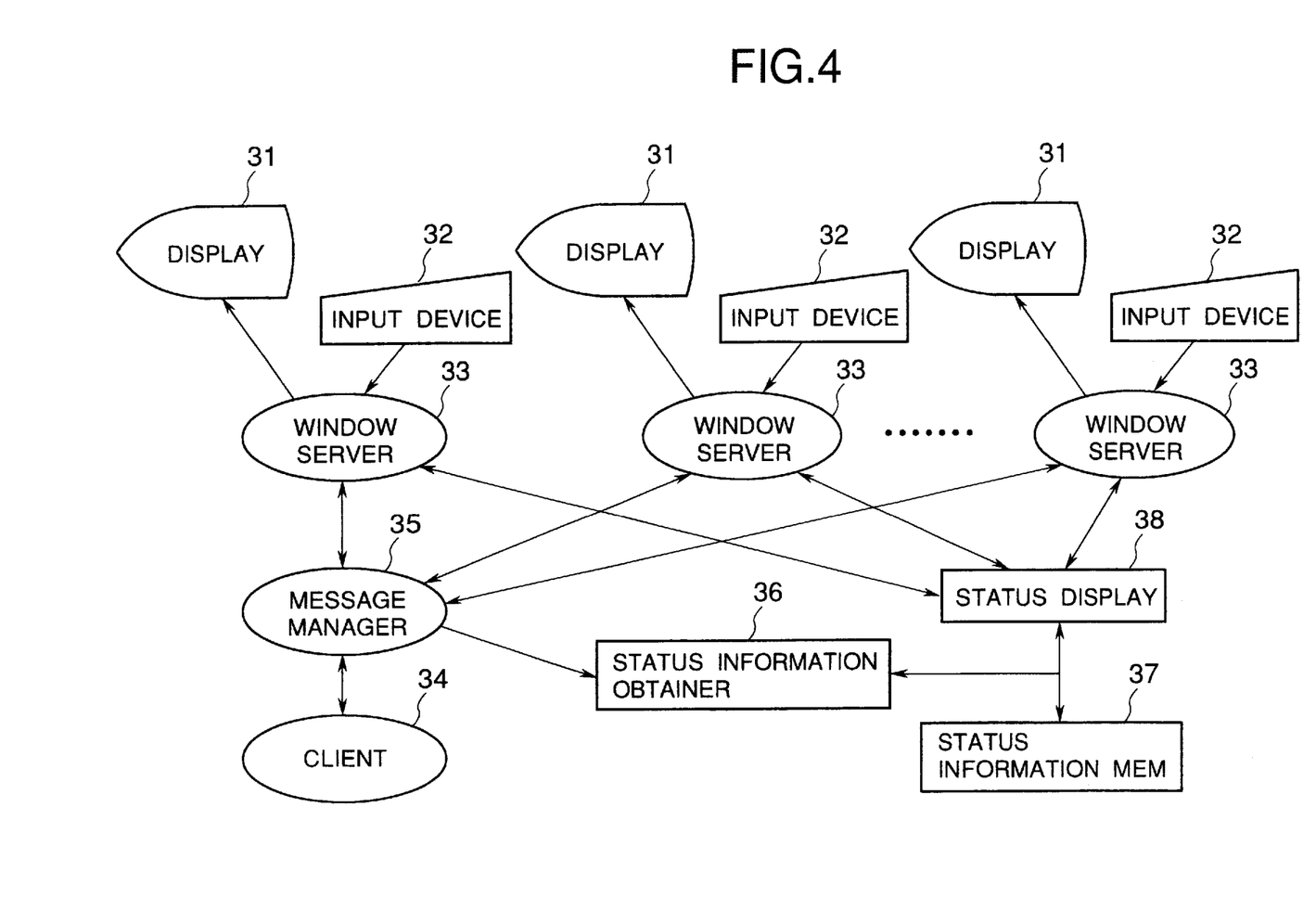
FIG. 4 is a block diagram showing a schematic construction of a system of the second embodiment.

FIG. 4 is a block diagram showing a schematic construction of a system of the second embodiment. The system comprises: a plurality of displays 31 . . . each having the same construction as that of the conventional display in FIG. 8; input devices 32 . . . ; window servers 33 . . . ; a client 34; a message manager 35; a status information obtainer 36 for managing status information of work of each user; a status information memory 37 for storing status information of each user; and a status display 38 for displaying a status of the work of each user in the windows of all of the users.

The display 31 and the input device 32 are connected to each window server 33. Each window server 33 is connected to the message manager 35 and status display 38. The message manager 35 is also connected to the client 34 and status information obtainer 36. The status information memory 37 and status display 38 are connected to the status information obtainer 36.

Figure 5:
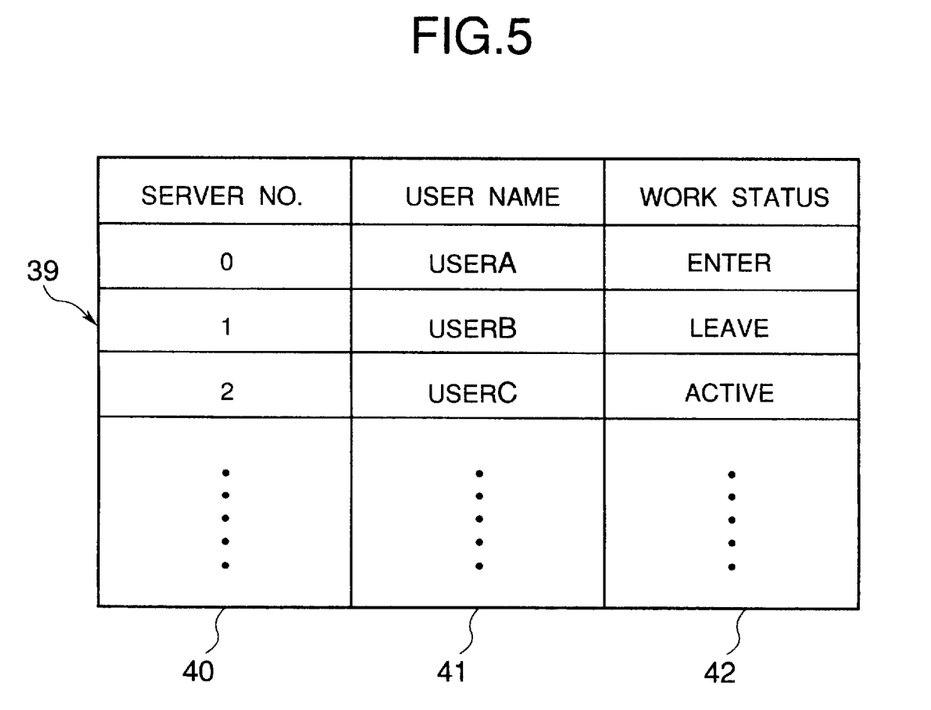
FIG. 5 is an explanatory diagram showing a status information table in the second embodiment.

A construction of the main section of the system will be described in detail. The status information obtainer 36 stores a status information table 39 as shown in FIG. 5 into the status information memory 37 on the basis of a message which is managed by the message manager 35. In FIG. 5, the number of the window server is stored in a column 40, a user name (or host name) who has the window server of the number stored in the column 40 in the same line is stored in a column 41, and a work status for the common window is stored in a column 42. Statuses are classified as follows. When the mouse-cursor doesn't lie in the common window, the status is set to "LEAVE". When the mouse-cursor lies in the common window but no inputting operation is executed, the status is set to "ENTER". When the mouse-cursor lies in the common window and the inputting operation is being executed, "ACTIVE" is stored.

When the message manager 35 relays an even message notifying a change in the work status, the status information obtainer 36 updates the column 42 in the status information table 39 in the status information memory 37 and requests the status display 38 to display the updated status.

Figure 6:
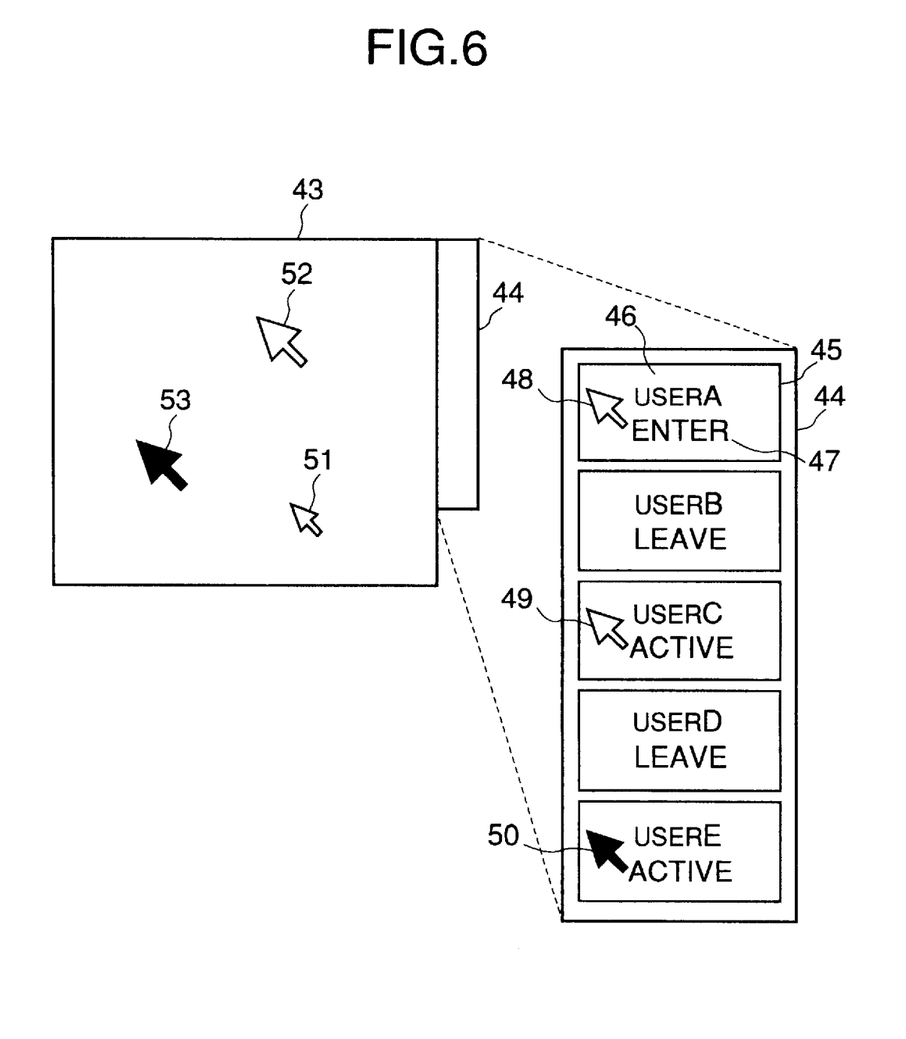
FIG. 6 is an explanatory diagram showing a status display example in the second embodiment.

FIG. 6 is a diagram showing an example of a display format displayed on each of the displays 31 by the status display 38. In FIG. 6, a common window 43 is accompanied with a status display window 44. Status display regions 45 (of the number corresponding to the number of cooperative workers) each for displaying the status of the user are displayed in the status display window 44. A user name 46 and a work status 47 are displayed in each of the status display regions 45. Further, when the status is "ENTER" or "ACTIVE", pointers of different colors are displayed as shown by reference numerals 48 to 50 and are also displayed at the positions of the mouse-cursors in the common window. A pointer of a large bit map is displayed at the position of the mouse-cursor of the user whose work status is "ACTIVE" so as to be distinguished from the work status of "ENTER". Namely, in the common window in FIG. 6, a size of a pointer 51 of a user A whose status is "ENTER" and sizes of pointers 52 and 53 of users C and E whose statuses are "ACTIVE" are different.

Figure 7:
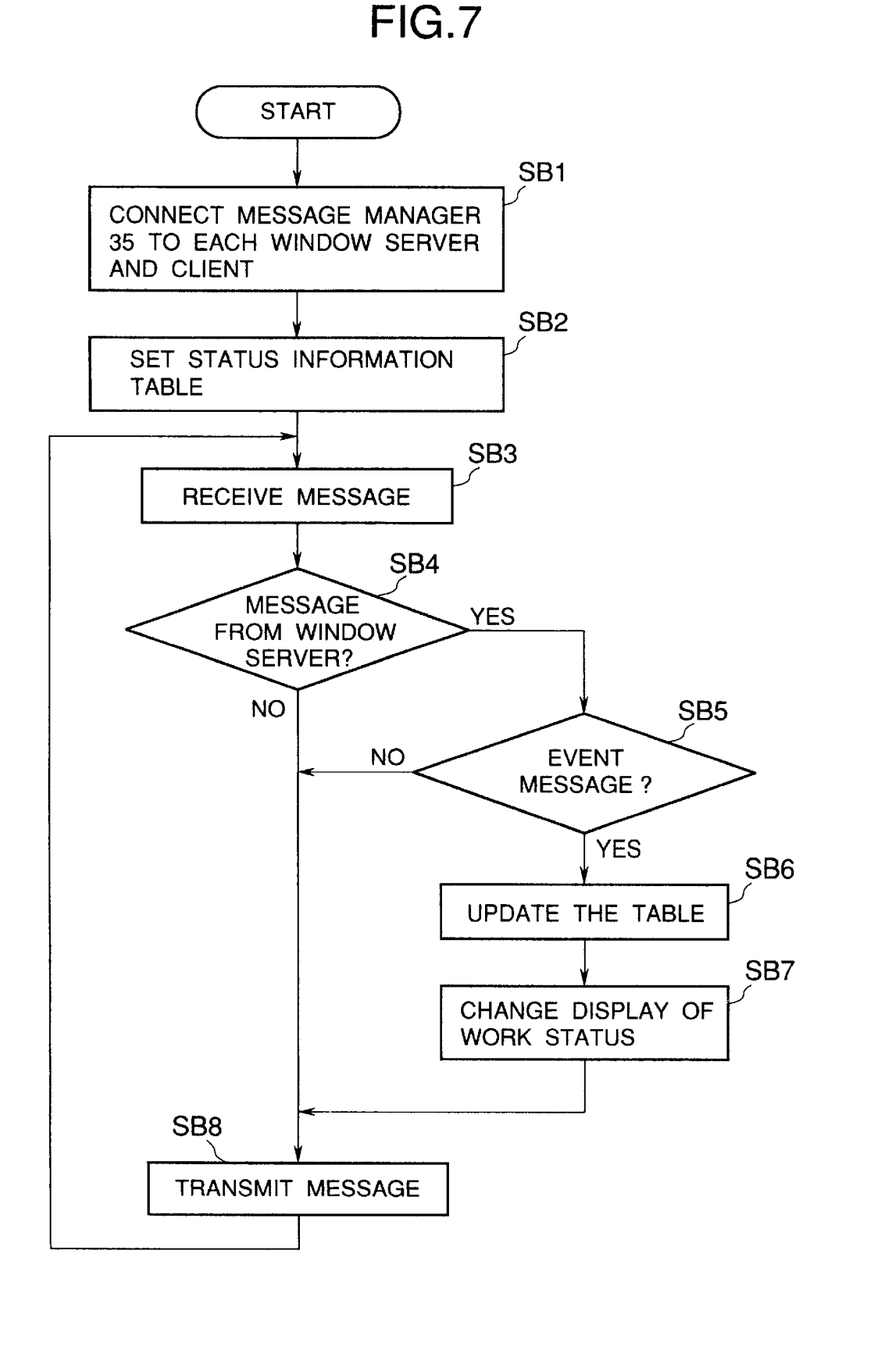
FIG. 7 is a flowchart showing a processing operation of the second embodiment.

FIG. 7 is a flowchart showing a processing operation of the second embodiment. First, in step SB1, the message manager 35 is connected to the window servers and the client of the application tool. In this instance, a server number is allocated to each window server, thereby distinguishing that the message has been sent from which window server. In step SB2, the message manager 35 notifies the status information obtainer 36 of the server number allocated in step SB1 and the user name having the window server of the server number. The status information obtainer 36 assures a table of a necessary capacity in the status information memory 37 and records the server number and the user name. The work status is initialized to "LEAVE". The server number is notified to the status display 38, thereby requesting the status display 38 to connect to each window server.

Upon receipt of the request, the status display 38 is connected to the designated window server and forms the status display regions 45 of the number corresponding to only the number of window servers connected to the status display window 44 in FIG. 6. The status display 38 accesses the status information memory 37 and displays the user name and the work status. When an event message is received from the window server, the message manager 35 notifies the status information obtainer 36 of the event message and the server number indicating from which window server the event message was received. The status information obtainer 36 updates the work status of the column of the relevant server number in column 42 in accordance with the contents of the event. (Step SB3→step SB4→step SB5→step SB6.)

When the message is an event message (in case of the X protocol, Enter Notify event) indicating that the mouse-cursor enters the common window, the work status is updated to "ENTER". When it is an event message (in the case of the X protocol, Leave Notify event) indicating that the mouse-cursor goes out of the common window, the work status is updated to "LEAVE". When the work status is "ENTER" and a notification that the window server is sending another event message, the work status is set to "ACTIVE". After that, when no event message is sent from the window server for a predetermined time (for example, one second), the work status is returned to "ENTER".

In step SB7, the status information obtainer 36 notifies the status display 38 of the server number whose work status was changed and requests to change the status display. Upon receipt of the request, the status display 38 first changes the work status display. In the case of changing the work status to "ACTIVE", the pointers are displayed as shown by reference numerals 48 and 49 in FIG. 6. The message manager 35 transmits the event message to the client 34 in step SB8. When a message other than the event message is received, the message manager 35 transmits the message to the client 34 or window server 33. (Step SB3→step SB4→step SB8, step SB3→step SB4→step SB5→step SB8.)

By executing the processes as mentioned above, the user can confirm whether the inputting operation has been performed to the common window or not without looking away from the common window, so that there is an effect that more efficient cooperative work can be performed.

(3) Other Embodiments

In the second embodiment, as shown in FIG. 6, the pointer is displayed to the position of the mouse-cursor of the user when the work status is "ENTER" or "ACTIVE" and, further, the pointers of the bit maps having different sizes are displayed depending on whether the user is executing the inputting operation to the common window or not, thereby distinguishing between the status of "ENTER" and the status of "ACTIVE". The invention isn't limited to the above construction, but also can be embodied in a manner such that the status of "ENTER" and the status of "ACTIVE" are distinguished by changing the shapes, colors, or the like of the bit maps of the pointers. Further, the invention also can be embodied in a manner such that the pointer is not displayed in the case of the status of "ENTER" but the pointer is displayed only in the case of the status of "ACTIVE".

According to the invention as mentioned above, there are provided: the window ID obtaining means for obtaining the window ID of the common window formed by the client application and storing the window ID into the first memory means; the operation right information obtaining means for obtaining the information of the operation right for the client application and storing the information into the second memory means; the operation pointer display control means for displaying the operation pointer to operate the client application onto the common window on the basis of the window ID; the operation right information display control means for adding the operation right information to the operation pointer and displaying the information; and the operation right information switching means for storing the information regarding the user who executed the click operation by the mouse-cursor on the operation pointer into the second memory means and for switching the operation right. The user can consequently obtain the information regarding the user having the operation right without executing extra operations and, further, can transfer the operation right by using the operation pointer, so that there is an effect such that the work efficiency can be improved. Since the operation pointer in each host is displayed at the same position as the operation pointer in the host having the operation right, it can be determined what operation is presently executed by the operation right holder, so that there is an effect that the work efficiency can be improved.

According to the invention, in the case wherein the host as a target is a host having the operation right, since the bit map of the mouse-cursor in the common window is converted to the bit map of the operation pointer, there is an effect such that the work efficiency of the user using the host can be improved.

According to the invention, further, when the mouse-cursor in the common window has already been converted to the bit map of the operation pointer in the target host, the bit map of the mouse-cursor in the common window is converted to the bit map of the mouse-cursor of the original common window, so that there is an effect such that the work efficiency of the user using the host can be improved in a manner similar to the above invention.

According to the invention, there are provided: the message managing means, connected between the window server of each terminal and the client, for relaying and distributing the message transmitted and received between each window server and the client; the status information obtaining means for storing the input status information for a common window at each terminal into the memory means on the basis of the message which is relayed by the message managing means; and the status display control means for displaying the input status information onto the display of each terminal. The user can confirm on the common window on the display of another terminal whether the inputting operation has been performed to the common window or not. Since the user can, therefore, confirm without looking away from the common window, there is an effect such that more efficient cooperative work can be executed.

According to the invention, when the position of the mouse-cursor in a certain terminal is located on the common window, the status display control means allows the pointer to be displayed at the same position as that of the mouse-cursor on the display of another terminal and the input status display pointer of the bit map which differs depending on whether the inputting operation has been executed to the common window or not is displayed on the display, so that there is an effect such that the user can execute the efficient cooperative work.

According to the invention, when the position of the mouse-cursor in a certain terminal is located on the common window and the inputting operation has been executed to the common window, the status display control means displays the input status display pointer at the same position as that of the mouse-cursor on the display of another terminal and doesn't display the input status display pointer in the other cases. In a manner similar to the above invention, therefore, there is an effect such that the user can execute efficient cooperative work.

What is claimed is:

1. A window sharing system of a server client method in which a client application communicates with a plurality of servers by distributing a message and an operation is executed by switching an operation right for said client application, said system comprising:

window ID obtaining means for obtaining a window ID of a common window formed by said client application and storing said window ID into first memory means;

operation right information obtaining means for obtaining information regarding said operation right for said client application and for storing said information into second memory means;

operation pointer display control means for displaying an operation pointer to operate the client application to said common window on the basis of the window ID stored in said first memory means;

operation right information display control means for adding the operation right information stored in said second memory means to said operation pointer and displaying the information; and operation right information switching means for storing information regarding the user who performed a click operation by a mouse-cursor on said operation pointer into said second memory means and for switching the operation right.

2. A system according to claim 1, wherein said system further comprises converting means for converting a bit map of the mouse-cursor of said common window to a bit map of said operation pointer when a host as a target is a host having the operation right.

3. A system according to claim 1, wherein said system further comprises converting means for converting the bit map of the mouse-cursor of said common window to the bit map of the mouse-cursor of the original common window when the mouse-cursor of said common window has already become a bit map of said operation pointer in a host as a target.

4. A display control apparatus comprising:

window display means for displaying a same window to a plurality of displays;

judging means for judging which one of the input devices corresponding to the plurality of displays has an access right to the window and for producing a judgment result, wherein cursors corresponding to respective input devices are displayed on the plurality of displays; and control means for changing a display condition of the cursor for one of the input devices which has the access right so as to display the access right on the basis of the judgment result of said judging means.

5. An apparatus according to claim 4, wherein a status of each input device is displayed by the windows displayed on said plurality of displays.

6. A display control method comprising the steps of:

displaying the same window to a plurality of displays;

judging which one of input devices corresponding to the plurality of displays has an access right to the window, and producing a judgment result;

displaying cursors corresponding to respective input devices on the plurality of displays; and changing a display condition of the cursor for one of the input devices which has the access right so as to display the access right on the basis of the judgment result of said judging step.

7. A method according to claim 6, further comprising displaying a status of each input device by the windows displayed on the plurality of displays.

8. A system comprising a first apparatus having a first display device and a first input device and a second apparatus having a second display device and a second input device, the first and second apparatuses being connected to each other through a communication line, said system comprising:

window display means for displaying a common window on the first and second display devices;

first cursor display means for displaying a first cursor on the first display device, the first cursor being moved by the first input device;

second cursor display means for displaying a second cursor on the second display device, the second cursor being moved by the second input device;

display control means for displaying a third cursor on the second display device at a position corresponding to a position on the first display device at which the first cursor is currently displayed; and display changing means for changing a display condition of one of the second and third cursors depending on which one of the first and second apparatuses has an access right to the window.

9. A system according to claim 8, wherein the display condition of the third cursor is made different on the basis of an operation condition of the first apparatus.

10. A system according to claim 8, wherein the third cursor is displayed when the first cursor is positioned within the window.

11. A system according to claims 8, wherein a name of the first apparatus or a name of a user of the first apparatus is displayed on the second display device in correspondence to the third cursor.

12. A display control apparatus comprising:

window display means for displaying on a display device a window commonly used by a plurality of apparatuses;

input means for moving a cursor displayed on the display device;

cursor display means for displaying on the display device a cursor of another apparatus in response to information received from the other apparatus;

memory means for storing information regarding an access right to the window; and control means for changing a display condition of one of the cursor and the cursor of the other apparatus on the basis of the information stored in said memory means so as to display the access right.

13. An apparatus according to claims 12, wherein the cursor of the other apparatus is displayed on the display device when the cursor is positioned within the window.

14. An apparatus according to claim 12, wherein the display condition of the cursor of the other apparatus is changed on the basis of an operation condition of the other apparatus.

15. A window sharing method for a server client method in which a client application communicates with a plurality of servers by distributing a message and an operation is executed by switching an operation right for the client application, said method comprising:

obtaining a window ID of a common window formed by the client application and storing the window ID into a first memory;

obtaining information of the operation right for the client application and storing the information into a second memory;

displaying an operation pointer to operate the client application to the common window on the basis of the window ID stored in the first memory;

adding the operation right information stored in the second memory to the operation pointer and displaying the information; and storing information regarding the user who performed a click operation by a mouse-cursor on the operation pointer into the second memory and switching the operation right.

16. A method according to claim 15, further comprising converting a bit map of the mouse-cursor of the common window to a bit map of the operation pointer when a host as a target is a host having the operation right.

17. A method according to claim 15, further comprising converting the bit map of the mouse-cursor of the common window to the bit map of the mouse-cursor of the original common window when the mouse-cursor of the common window has already become a bit map of the operation pointer in a host as a target.

18. A computer readable medium storing a program for performing the steps of:

displaying the same window to a plurality of displays;

judging which one of input devices corresponding to the plurality of displays has an access right to the window and producing a judgment result;

displaying cursors corresponding to respective input devices on the plurality of displays; and changing a display condition of the cursor for one of the input devices which has the access right so as to display the access right on the basis of the judgment result of said judging step.

19. A memory medium according to claim 18, wherein a status of each input device is displayed by the windows displayed on the plurality of displays.

20. A computer-readable memory medium for use with a first apparatus having a first display device and a first input device and a second apparatus having a second display device and a second input device, the first and second apparatuses being connected to each other through a communication line, and for storing a program for performing the steps of:

displaying a common window on the first and second display devices;

displaying a first cursor on the first display device, the first cursor being moved by the first input device;

displaying a second cursor on the second display device, the second cursor being moved by the second input device;

displaying a third cursor on the second display device at a position corresponding to a position on the first display device at which the first cursor is currently displayed; and changing a display condition of one of the second and third cursors depending on which one of the first and second apparatuses has an access right to the window.

21. A memory medium according to claim 20, wherein the display condition of the third cursor is changed on the basis of an operation condition of the first apparatus.

22. A memory medium according to claim 20, wherein the third cursor is displayed when the first cursor is positioned within the window.

23. A memory medium according to claim 20, wherein a name of the first apparatus or a name of a user of the first apparatus is displayed on the second display device in correspondence to the third cursor.

24. A computer-readable memory medium for storing a program for performing the steps of:

displaying on a display device a window commonly used by a plurality of apparatuses;

moving a cursor displayed on the display device;

displaying on the display device a cursor of another apparatus in response to information received from the other apparatus;

storing information regarding an access right to the window; and changing a display condition of one of the cursor and the cursor of the other apparatus on the basis of the stored information so as to display the access right.

25. A memory medium according to claims 24, wherein the cursor of the other apparatus is displayed on the display device when the cursor is positioned within the window.

26. A memory medium according to claim 24, wherein the display condition of the cursor of the other apparatus is changed on the basis of an operation condition of the other apparatus.

* * * * *